(No Model.)

J. G. CLIFTON.
GARDEN TOOL.

No. 510,406. Patented Dec. 12, 1893.

Witnesses
Chas. W. Parker
J. S. Barker

John G. Clifton, Inventor.
by Charles Wm. B. King,
Attys.

UNITED STATES PATENT OFFICE.

JOHN G. CLIFTON, OF FORT LAWN, SOUTH CAROLINA.

GARDEN-TOOL.

SPECIFICATION forming part of Letters Patent No. 510,406, dated December 12, 1893.

Application filed April 5, 1893. Serial No. 469,226. (No model.)

*To all whom it may concern:*

Be it known that I, JOHN G. CLIFTON, a citizen of the United States, residing at Fort Lawn, in the county of Chester and State of South Carolina, have invented certain new and useful Improvements in Garden-Tools; and I do hereby declare the following to be a full, clear, and exact description of the invention, such as will enable others skilled in the art to which it appertains to make and use the same.

My invention consists of a combination with a garden tool of a handle hinged thereto in a novel manner as will be hereinafter described.

Figure 1:
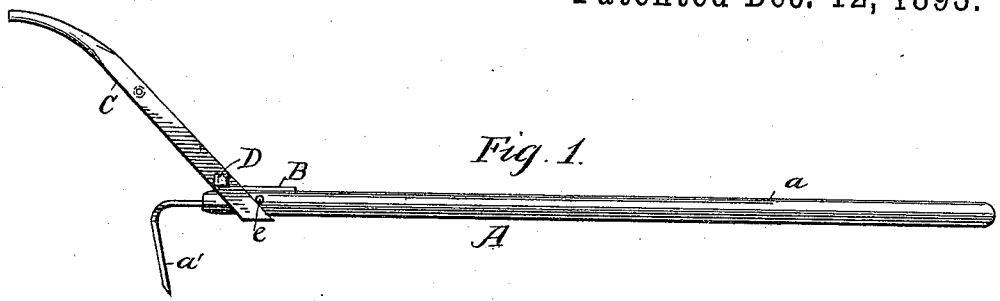
Figure 2:
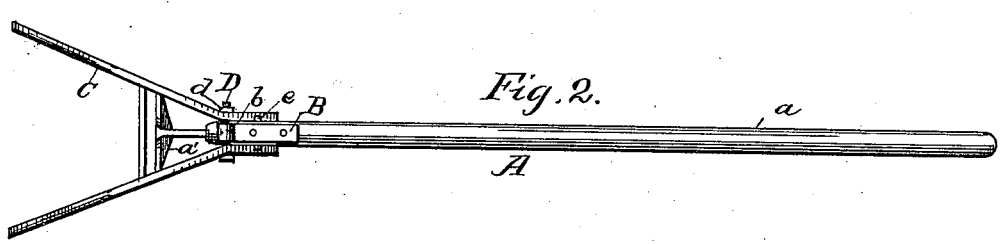
Figure 3:
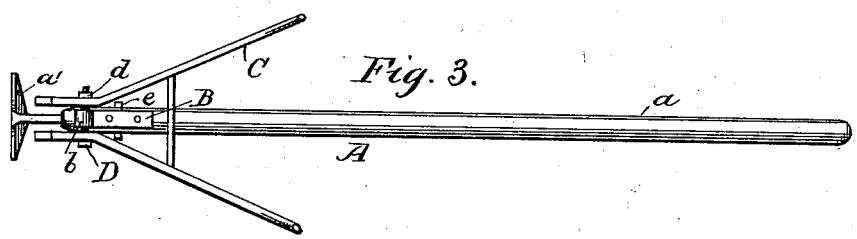
Figure 4:
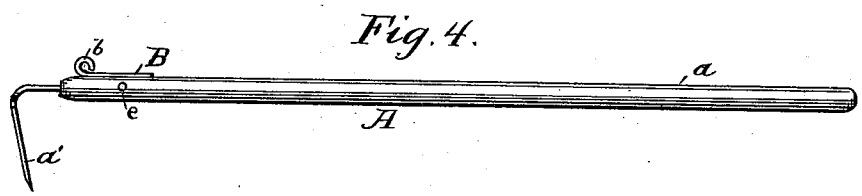

In the drawings, Figure 1 is a side view of a garden tool provided with my invention. Fig. 2 is a top plan view of the same. Fig. 3 is a side view showing the pivoted handle swung so as to rest upon the handle of the tool, and Fig. 4 shows the garden tool with the pivoted handle removed.

In the drawings A represents a garden tool which may be of any usual or preferred construction. It consists of the handle $a$ and the earth-stirring tool or implement $a'$ which as shown in the drawings, is a triangular shaped hoe. In place of the hoe there may be a rake or other tool, as desired.

To the upper side of the handle $a$ of the tool and near that end which has secured to it the implement $a'$ there is secured a plate B which forms one member of a hinge connecting a swinging guiding handle C with the handle $a'$ of the garden tool. The rear or lower end of the plate B is formed into an eye or loop $b$ and through this passes the fulcrum or pivot pin D carried by the handle C. A nut $d$ upon a screw threaded end of the bolt D holds the hinge parts of the device in place.

The guiding handles C may be of any usual or preferred construction, and as shown are formed similar to the ordinary plow or cultivator handles. These handles can be swung forward so as to lie upon the upper side of the draft handle $a$ of the tool, as shown in Fig. 3. When the guiding handle is in ordinary working position, that is, as shown in Fig. 1, the lower ends may abut against stop pieces $e$ carried by the draft handle of the tool. These stop pieces prevent the guiding handle from swinging too far backward. They may however be dispensed with and the rear or lower end of the draft handle $a$ made tapering as shown in Fig. 2 so that the lower ends $c$, of the handles C, which project beyond the pivot bolt D, shall engage with the sides of the handle $a$ when the guiding handle C is thrown backward, but shall not engage therewith when it is thrown forward as shown in Fig. 3.

My invention possesses several advantages which I believe are not possessed by any other tool.

The invention can be applied to any of the ordinary garden tools such as hoes of various kinds and shapes, rakes, and the like. When the invention is applied thereto the tool can be drawn through the earth by one person and another can guide it properly by means of the guiding handle. By throwing the handle C forward upon the draft handle, as shown in Fig. 3, the tool can be carried up close to a wall or fence so that there will not be left places at the ends of the rows or the fields which are not properly cultivated as is the case with tools provided with handles as they ordinarily are. The guiding handles C are easily removable and this allows the tool A to be used in the ordinary manner for hand cultivation.

It will be apparent that my invention is not limited to ordinary hand tools but can be applied to cultivating implements of larger size adapted to be drawn by horse power.

When the invention is applied to an implement of this character the advantages incident to being able to cultivate close to a wall or fence are secured.

Having thus described my invention, what I claim, and desire to secure by Letters Patent, is—

1. In combination with a garden tool or implement provided with a draft handle $a$, a guiding handle C, hinged to the upper side of the draft handle $a$ near to its rear or lower end, substantially as set forth.

2. The combination with a garden tool or implement A, provided with a handle a, and an earth-stirring implement or tool, a', at one end of the handle, of the hinged plate piece secured to the upper side of the handle, a, near its lower end, and the handle C connected to the handle a, by a bolt which engages with the plate B, the handle C being adapted to swing forward upon the handle a, substantially as set forth.

In testimony whereof I affix my signature in presence of two witnesses.

JOHN G. CLIFTON.

Witnesses:
D. H. JORDAN,
G. V. JORDAN.